Feb. 14, 1967    R. POHLMAN ETAL    3,304,449
APPARATUS FOR PRODUCING SONIC AND ULTRASONIC OSCILLATIONS
Filed Aug. 22, 1963    3 Sheets-Sheet 1

INVENTORS
Reimar Pohlman and
Ernst Günter Lierke
BY
Michael S. Striker
Attorney

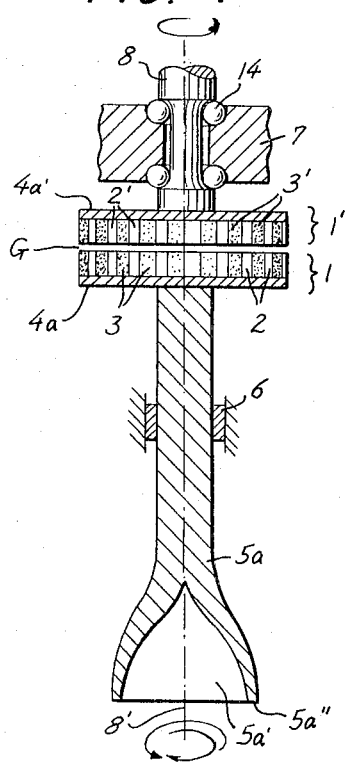
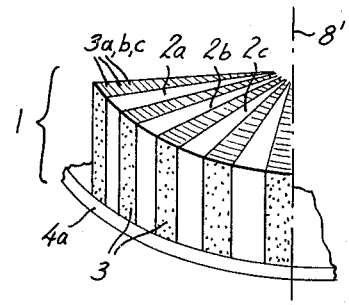
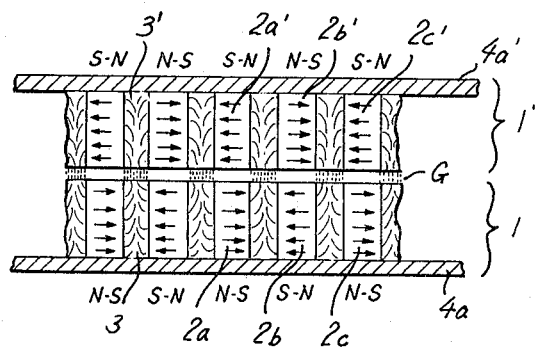
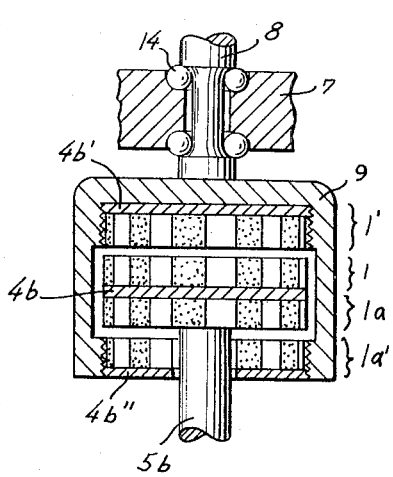

Feb. 14, 1967 R. POHLMAN ETAL 3,304,449
APPARATUS FOR PRODUCING SONIC AND ULTRASONIC OSCILLATIONS.
Filed Aug. 22, 1963 3 Sheets-Sheet 3
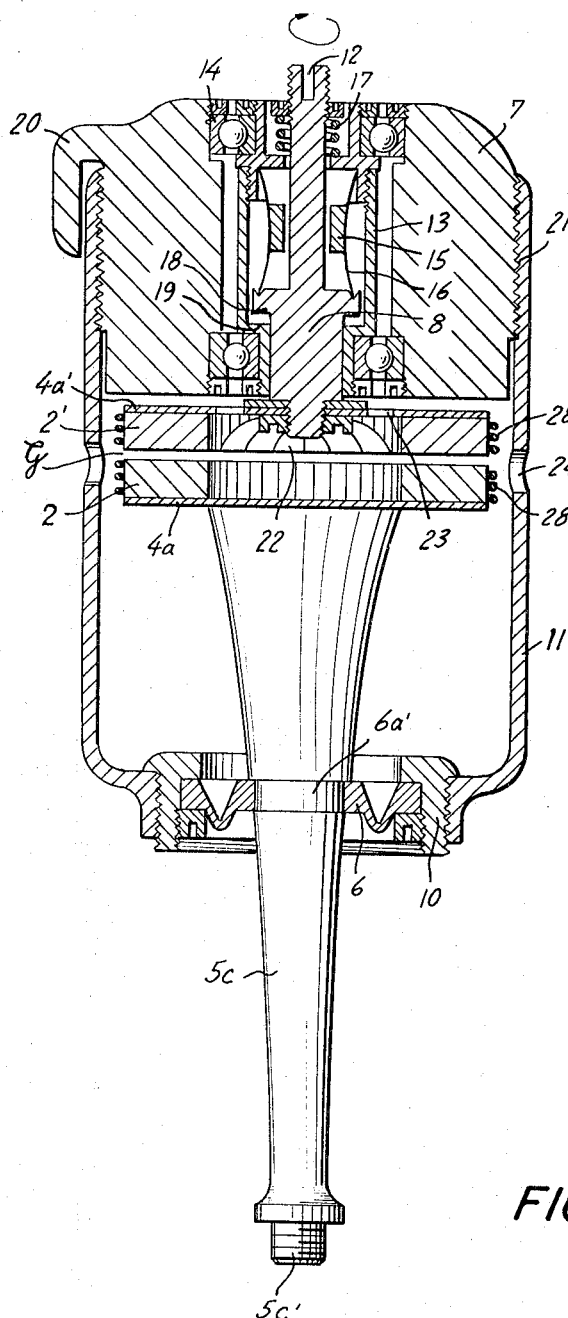
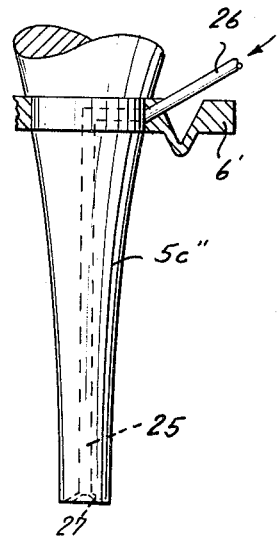
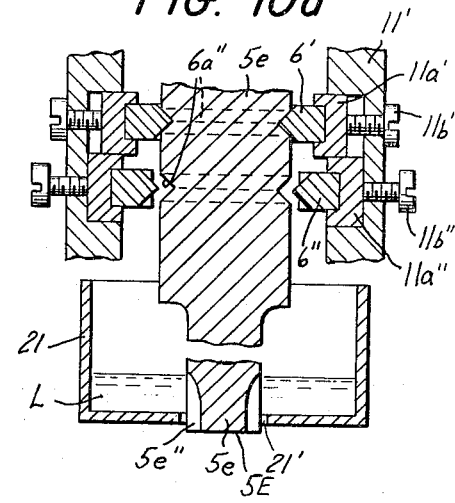
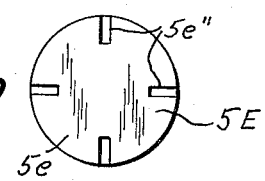
INVENTORS
Reimar Pohlman and
Ernst Günter Lierke
BY Michael S. Striker
Attorney United States Patent Office 3,304,449
Patented Feb. 14, 1967

3,304,449
APPARATUS FOR PRODUCING SONIC AND
ULTRASONIC OSCILLATIONS
Reimar Pohlman, Schumannstrasse 2, Darmstadt, Germany, and Ernst Gunter Lierke, Kampchenstrasse 10, Kohlscheid, Germany
Filed Aug. 22, 1963, Ser. No. 303,734
21 Claims. (Cl. 310—103)

The present invention concerns the production of sonic and ultransonic oscillations of a solid body, and more particularly sonic or ultrasonic oscillations of an elongated body the oscillations of which appearing at one end thereof being suitable for operating a vibratory tool, for dissipating liquids, for producing heat and for other purposes.

It is well known to use mechanical means for producing oscillations of an elongated solid body. However, this system can be used only within comparatively low frequency ranges and the mechanical means producing the oscillation are subject to considerable wear. Other means for producing oscillations have been found to be unsatisfactory in certain respects.

It is therefore one object of this invention to provide for a system of producing sonic and ultrasonic oscillations of an elongated solid body in a manner which is free of the difficulties encountered with arrangements known to the art.

It is another object of the invention to provide for a system which makes it easy to produce the above-mentioned oscillations with frequencies located in the upper portion of the sonic frequency range and in at least the lower portion of the ultrasonic frequency range.

It is still another object of this invention to provide for a system of the type set forth by which the above-mentioned oscillations can be produced without any substantial wear of the moving components thereof.

It is still another object of this invention to provide for a system which is equally suitable for producing longitudinal oscillations as torsional oscillations.

It is a further object of this invention to provide for a system of the type set forth which can be used alternatively for producing longitudinal and torsional oscillations.

With the above objects in mind the invention includes an apparatus for producing sonic and ultrasonic oscillations of a vibratory body, comprising, in combination, a vibratory body including a stationary portion and a freely vibratable portion; holding means for stationarily holding said stationary portion of said vibratory body while permitting said freely vibratable portion thereof to oscillate; first magnetic means firmly attached to said freely vibratable portion of said vibratory body; second magnetic means mounted adjacent to said first magnetic means independently therefrom and from said freely vibratable portion of said vibratory body, said first and second magnetic means cooperating in such a manner that when said second magnetic means is periodically caused to be in a predetermined magnetic condition relative to said first magnetic means it causes oscillation of said freely vibratable portion of said vibratory body; and means for periodically establishing said predetermined magnetic condition of said second magnetic means relative to said first magnetic means at a frequency within the sonic and ultrasonic frequency range so as to thereby cause corresponding oscillation of said freely vibratable portion of said vibratory body at said frequency.

The novel features which are considered as characteristic for the invention are set forth in particular in the appended claims. The invention itself, however, both as to its construction and its method of operation together with added objects and advantages thereof, will be best understood from the following description of specific embodiments when read in connection with the accompanying drawings, in which:

FIG. 2b is a sectional elevation of the component shown by FIG. 2a, the section being taken along line II—II of FIG. 2a;

FIG. 4 is a diagrammatic sectional elevation showing portions of a second embodiment of the invention;

FIG. 5 is fractional perspective view of a component of the arrangement according to FIG. 4;

FIG. 6 is a diagrammatic fractional elevation of a portion of the arrangement according to FIG. 4;

FIG. 7 is a fractional sectional elevation illustrating a modification of the arrangement according to FIG. 4;

FIG. 8 is a sectional elevation showing details of structure applicable to all embodiments of the invention;

FIG. 9 is a fractional, partly sectional elevation of a modification of the arrangement according to FIG. 8;

FIG. 10a is a sectional elevation showing another modification of the arrangement according to FIG. 8; and FIG. 10b is a partial end view of the arrangement according to FIG. 10a.

Figure 1:
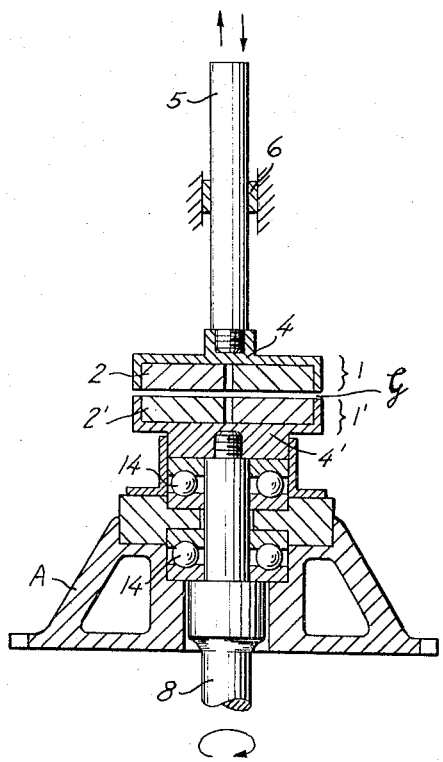
FIG. 1 is a diagrammatic sectional elevation of one embodiment of the invention.
Figure 2B:
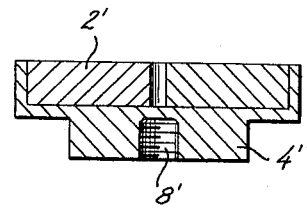
Figure 2A:
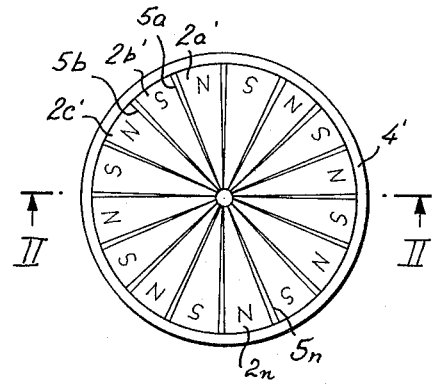
FIG. 2a is a plan view of one component of the arrangement according to FIG. 1.
Figure 3:
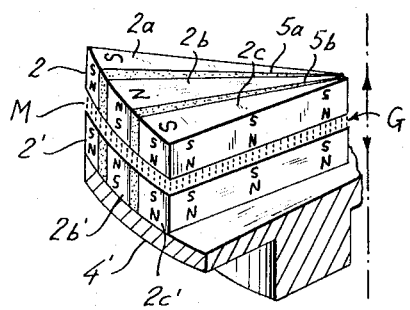
FIG. 3 is a fractional perspective view of a portion of the arrangement according to FIG. 1.

FIGS. 1-3 illustrate diagrammatically an embodiment of the invention which is specifically well suited for producing in a vibratory body longitudinal oscillations. This mode of oscillation is to be distinguished from translatory vibration in axial direction, transverse oscillations and torsional oscillations. This longitudinal oscillations referred to in the context of this invention are actually compression waves travelling in the axial direction of the vibratory body.

As can be seen from FIG. 1 a support base A is provided which rotatably supports by means of ball bearings 14 a drive shaft 8 which, in turn, carries first magnetic means 1' for rotation about the axis of shaft 8. It should be noted that in this specification and in the claims the term "magnetic means" and "magnet means" include all devices capable of producing a magnetic field and therefore include electromagnetic devices as well as permanent magnets. In the present example the magnetic means 1' include permanent magnets 2' as will be described further below. A vibratory system or assembly composed of an elongated vibratory body 5 and a further magnetic means 1 attached thereto is mounted stationarily opposite and adjacent to the magnetic means 1' and coaxially therewith so as to leave a predetermined narrow gap G between the opposing faces of the magnetic means 1 and 1'. Stationarily means in this context that the vibratory system 5 and 1 as a whole is prevented from carrying out translatory motion in axial direction. Incidentally, also the magnetic means 1' are prevented from such translatory movements in axial direction by the conventional structure of the ball bearings 14.

The vibratory system 5, 1 is held in a predetermined position relative to the magnetic means 1' by stationary holding means indicated diagrammatically at 6 which are understood to be rigidly connected with the base A as will be illustrated in greater detail by FIG. 8 described further below. The elongated vibratory body 5 together with the attached magnetic means 1 has a predetermined resonant frequency and for the abovementioned mode of oscillation, namely longitudinal oscillation, a predetermined node which is therefore to be considered as a stationary portion of the vibratory body while the ends thereof, namely the free outer end and the opposite end to which the magnetic means 1 are attached constitute freely vibratable portions of the vibratory body.

FIGS. 2a-3 illustrate the construction of the magnetic means 1 and 1'. Both are constructed in a similar manner as will be seen from FIG. 3, but FIG. 2a and FIG. 2b illustrate specifically the magnetic means 1'. A soft iron body 4' serves as a holder and as a yoke for a plurality of permanent magnet sectors 2a', 2b', 2c', etc. constituting together a magnet assembly 2', the entire assembly of permanent magnets extending in a plane perpendicular to the axis of the body 5 and surrounding this axis. The individual permanent magnet sectors are separated from each other by spacers 5a, 5b, etc. of non-magnetic material. The permanent magnet sectors 2a', 2b', 2c', etc. are all polarized in the direction of the axis of the arrangement but in such a manner that the direction of the magnetic flux in each of the permanent magnets sectors is opposite to that in the respective neighboring sectors. This can be seen clearly from FIGS. 2a and 3. The member 4' has a threaded hole 8' by means of which the assembly 1' can be attached to the end of the shaft 8.

Quite similarly the magnetic means 1 comprise a soft iron member 4 serving as a yoke and support for an assembly 2 of permanent magnets 2a, 2b, 2c, etc. The member 4 is provided with a socket for rigidly attaching the assembly 1 to the one end of the vibratory body 5.

FIG. 3 illustrates a position of the magnet means 1 relative to the magnetic means 1' in which maximum attraction exists between the individual permanent magnet sectors of the assembly 1 and the individual permanent magnet sectors of the assembly 1'. The direction of the lines of force M is shown in the gap G in FIG. 3. It will be understood that if now the assembly 1' is rotated through an angle corresponding to the angle of one of the permanent magnet sectors a position will exist in which maximum repulsion exists between the respectively corresponding permanent magnet sectors of the two magnetic assemblies. Thus, if the magnetic means 1' is continuously rotated a periodic change between attraction and repulsion between the magnetic means 1 and 1' takes place so that, longitudinal oscillations of the vibratory body 5 are produced at its resonant frequency if the magnetic means 1' is rotated at a speed at which the number of revolutions times the number of permanent magnetic sectors surrounding the exist equals said resonant frequency.

It will be understood that the opposite ends of the vibratory body 5 carry out vibratory movements in axial directions while the node portion thereof is held stationary by the holding means at 6. For a maximum efficiency the gap should be made as small as possible but this size of the gap is of course limited by the maximum amplitude of the above-mentioned axial vibratory movements of the end of the vibratory body 5 to which the assembly 1 is attached. Moreover, for maximum efficiency the material of the permanent magnet sectors should be sintered magnetic material having as high a coercivity and remanence as possible, as for instance a material known by the trade name Sintered Alnico 2 or Sintered Oxide Vectalite listed on pages 2–67 of "Electrical Engineers Handbook," published 1950 by John Wiley and Sons, Inc., New York.

The resonant frequency of the vibratory system 5, 1 and the location of its node relative to longitudinal oscillations can be predetermined with close approximation by conventional calculation or can be found easily by experimentation e.g. by driving the shaft 8 at varying speeds until the speed is found at which maximum amplitude of the longitudinal oscillations is obtained whereby the corresponding resonant frequency is determined.

If in this manner longitudinal oscillations at resonant frequency are produced the resulting amplitudes are considerable and can be utilized for various applications of sonic or ultrasonic oscillation. For this purpose the shape of the elongated vibratory 5 and particularly of its outer free end may be chosen to suit the particular purpose or operation.

The embodiment as illustrated by FIGS. 4-6 is generally similar to the above described first embodiment but differs in the details of the construction of the magnetic means 1 and 1'. These differences as described further below serve the purpose of greatly increasing the obtainable intensity of the oscillations and of making it possible to produce not only longitudinal oscillations as mentioned above but also a different mode of oscillations namely torsional oscillations of the vibratory body.

In this connection it is significant that the induction obtainable at saturation of the material amounts to only about one-tenth in the case of permanent magnet material as compared with high grade ferromagnetic alloys so that the forces per unit of area obtainable with one and the other type of materials have a ratio of 1:100. However, the embodiment of the invention according to FIGS. 5-6 makes it possible to overcome this apparent disadvantage and to produce also with permanent magnets very great intensity of oscillation whereby the range of applicability of an ultrasonic oscillator is greatly increased. In particular, the arrangement to be described further below makes it also possible to produce very substantial torsional forces relative to the axis of the arrangement, so that, as stated above, also torsional oscillations can be produced with great efficiency. This means, that the same structure as provided by the invention can be used both for producing longitudinal oscillations and torsional oscillations.

As shown by FIG. 4, some stationary frame 7 is provided which supports as in the first embodiment ball bearings 15 which, in turn, rotatably support a shaft 8. Attached to the shaft 8 is a magnetic means 1' so as to be rotatable about the axis of the shaft 8. Mounted opposite to the magnetic means 1' are magnetic means 1 and attached thereto an elongated vibratory body 5a coaxial with the axis of the shaft 8. The vibratory system comprising the elongated body 5a and the magnetic means 1 is held by holding means 6 at the stationary portion or node of the member 5a.

The construction of the magnetic means 1 and 1' is illustrated by FIGS. 5 and 6. For instance, the magnetic assembly 1 comprises a plate 4a extending perpendicular to the axis 8' of the shaft 8 and carrying a plurality of permanent magnetic sectors 2a, 2b, 2c, etc. surrounding said axis 8'. The individual permanent magnet sectors are separated from each other by similar sectors 3 made of ferromagnetic material and each being composed of a plurality of axially extending laminations 3a, 3b, 3c, etc. as shown. All these elements or at least some of them may be cemented together and attached by cementing to the plate 4a. For the purpose of rigidity the entire assembly of sectors 2 and 3 may be held together by a suitable bandage wrapped around the circumference thereof as will be described further below with reference to FIG. 8. The material of the permanent magnet sectors should be preferably a permanent magnet material of the sintered type and of high coercivity while the ferromagnetic material of the spacers 3 should be characterized by having a very high induction when saturated. Finally, in view of the high speed rotation of the magnet assembly 1 the plate or disc 4a should have high tensile strength.

Each of the permanent magnet sectors 2a, 2b, 2c, etc. is magnetically polarized in such a manner that the direction of the magnetic flux therein is opposite to that of the respective neighboring permanent magnet sectors. This is shown in FIG. 6. It can be seen that the permanent magnet sectors 2a, 2b, 2c, etc. are polarized in a plane perpendicular to the axis 8' and in a direction substantially circumferential relative to axis 8'.

The second magnetic assembly 1' is constructed in exactly the same manner and composed of a non-magnetic plate or disc 4a', permanent magnet sectors 2a', 2b', 2c', etc. and ferromagnetic spacers therebetween as indicated at 3'. The two magnetic assemblies 1 and 1' are again separated by a narrow gap G.

FIG. 6 illustrates a position of the rotatable magnetic means 1' relative to the other magnetic means 1 in which maximum attraction between respectively opposite permanent magnet sectors is assured. The path of the lines of force between the cooperating permanent magnet sectors and across the respectively adjacent ferromagnetic spacers is shown in FIG. 6.

It will be understood that again upon angular movement of the rotatable permanent magnet assembly 1' in the amount of the angle occupied by one permanent magnet sector and one adjacent ferromagnetic spacer a position of maximum repulsion is reached. Consequently, if the rotatable magnetic means 1' are continuously rotated, periodic changes between attraction and repulsion are created whereby the desired oscillation of the vibratory body 5a is obtained.

If the holding means 6 are arranged to hold the vibratory element 5a at its node associated with longitudinal oscillations and if the rotary speed of the shaft 8 and the magnetic means 1' corresponds to the resonant frequency of the vibratory system 5a, 1 at longitudinal oscillation thereof, then longitudinal oscillation of said vibratory system and particularly of the outer end of the vibratory member or body 5a at said resonant frequency will be achieved. If, however, the holding means 6 are arranged to hold the vibratory body 5a at its node corresponding to torsional oscillations and if the rotary speed of the shaft 8 corresponds to the resonant frequency of the vibratory systems 5a, 1 at torsional oscillation, then the desired torsional oscillation at the corresponding resonant frequency thereof will be achieved. Nevertheless, it may be stated that it is well possible to make the oscillating system mass-symmetrical, i.e. to distribute its mass in such a manner that the location of the node and therefore the location of the holding means 6 is such that this node location applies both to longitudinal and to torsional oscillations of the vibratory system 5a, 1. In this case only the resonant frequency for the two different modes of oscillation will differ and the desired oscillation can be obtained by selecting the rotary speed of the shaft 8.

FIG. 7 illustartes a modification of the arrangement according to FIGS. 4–6. The intensity of oscillations produced by the apparatus according to the invention can be further increased by providing not only one magnetic assembly 1 and one magnetic assembly 1' but a plurality of sets thereof. For instance, the arrangement according to FIG. 7 shows attached to the shaft 8 a non-magnetic holding member 9 which accommodates or surrounds two sets of magnetic means 1, 1' and 1a, 1a', respectively. Of these two sets the rotatable magnetic means 1' and 1a' including their non-magnetic support plates 4b' and 4b'', respectively, are mounted in the rotatable housing or member 9, while in the hollow space between the magnetic assemblies 1' and 1a' the stationary i.e. non-rotating magnetic assemblies 1 and 1a together with a common support 4b are located and attached to one end of an elongated vibratory body 5b.

It will be understood that it is easy to arrange the polarization of the individual permanent magnet sectors of the assemblies 1, 1' and 1a, 1a' in such a manner that at a given moment simultaneously maximum attraction is effected between the assemblies 1 and 1' while maximum repulsion is effected between the assemblies 1a and 1a', and vice versa at another given moment. Consequently, the forces of attraction and repulsion are doubled and the intensity of the oscillation is quadrupled. FIG. 8 illustrates in greater detail a practical embodiment of the invention incorporating most of the features of the above described embodiments. A rotatable shaft 8 is supported by ball bearings 14 in a comparatively heavy body 7 which is intended to absorb by its mass any oscillatory reaction forces that may appear in the axial direction of the shaft 8 during operation. The shaft 8 may be driven by any suitable means attachable to its outer end 12. At its opposite end the shaft 8 carries the rotatable magnetic means including the magnet elements 2' either according to FIGS. 1–3 or according to FIGS. 4–6. In the latter case the magnets 2' are supported by the plate or disc 4a' and are surrounded by a bandage 28 of non-magnetic material and high tensile strength. The body 7 is held by threaded engagement at 21 in a housing 11 which also constitutes the connection between the support body 7 and the holding means 6 for the elongated vibratory body 5c. The latter is connected at one end with the stationary i.e. not continuously rotating magnetic means which comprise the magnet elements 2 carried by the plate or disc 4a. The details of the magnet arrangement of the stationary magnetic means correspond of course to that in the above-mentioned rotatable magnetic means.

The holding means 6 are formed as an annular member held in the housing 11 by threaded clamping rings 10. The cross section of the annular holding ring 6 is as shown so that thereby transverse vibrations that may appear in the node portion of the vibratory body 5c are damped as little as possible. The holding ring 6 is firmly attached e.g. by shrinking to a corresponding annular portion 6a' of the vibratory member 5c.

Since development of heat in the interior of the apparatus cannot be avoided it is advisable to provide for cooling means. For this purpose for instance fan blades 22 may be arranged in the center portion of the rotating magnetic means assembly so that during rotation thereof air will be sucked in from one end of the apparatus through the ball bearings and through the openings 23 in the plate 4a' and blown out through the openings 24 in the housing 11.

The faces of the first and second magnetic means i.e. between the permanent magnet members 2' and 2 are separated by a gap G. It is desirable to vary the distance between these two faces under certain conditions. Generally, it may be desirable to vary the intensity of the produced oscillation by varying the size of the gap G. For this purpose the block or body 7 can be moved in axial direction by rotating it relative to the housing 11 since the body 7 and the housing 11 are connected by thread engagement at 21. A handle 20 may be provided for facilitating the turning of the body 7. In addition, it is desirable to start the rotation of the rotatable member of the apparatus while the dimension of the gap G is comparatively large because in this manner it is easier to increase the speed of rotation from the start up to the desired final operating speed. For this purpose the shaft 8 is mounted axially movable within a sleeve 13 rotating with the shaft 8. By a spring 17 the shaft 8 is normally urged in axial direction for giving the gap a predetermined starting maximum dimension. However, spring elements 16 are arranged between corresponding shoulders on the inside of sleeve 13 and on the shaft 8, respectively. These springs 16 carry weights 15 which are subjected to centrifugal force when the shaft 8 is rotated. Consequently, with increasing speed of rotation the weights 15 will cause the spring members 16 to stretch or to flatten whereby the shaft 8 is moved, against the action of spring 17, in axial direction so as to reduce the size of the gap G, the final dimension whereof is predetermined by the arrangement of shoulders 18 and 19 on the shaft 8 and in the sleeve 13, respectively. The shaft 8 can be moved by the spring 16 only until the shoulder 18 abuts against shoulder 19. Actually the original spacing between the shoulders 18 and 19 predetermines the maximum stroke of movement of the shaft 8, and the adjustment of the position of the support body 7 relative to the housing 11 predetermines the minimum size of the gap G.

It remains to explain that the elongated vibratory body may be shaped in various ways in order to carry out various functions.

For instance, FIG. 4 shows by way of example the outer end of the elongated vibratory body 5a provided with a recess 5a' surrounded by a substantially circular rim 5a''. This shape makes it possible to utilize the oscillations appearing at this outer end of the vibratory body 5a for instance for carrying out in a well known manner welding operations. Thus, the rim 5a" if oscillating in axial direction by longitudinal oscillation may be used for producing a substantially circular welding on synthetic materials e.g. for closing a round container of this material. Of course, in this case of application other shapes of weldings may be handled by giving the rim 5a" a contour different from the circular one. On the other hand, since it is well known that welding of metal requires oscillation in tangential direction i.e. an oscillation in a direction parallel to the surface of the metal to be welded, the arrangement according to FIG. 4 should be operated for this purpose so as to produce torsional oscillations. In this case for instance the covers of metal containers of circular form may be very efficiently welded in a single operational application of the rim 5a" at the required frequency of oscillations.

In many cases it is highly desirable to increase as much as possible the intensity of the oscillation at the free outer end of the elongated vibratory body. For this purpose it is advisable to use an elongated body the diameter of which decreases from the end which is attached to the respective magnetic means toward the outer or free end thereof. Preferably, if a continuous taper is to be used for the elongated body, a taper as illustrated by FIGS. 8 and 9 should be used as suggested by Mason and known to those skilled in the art as the so-called "Mason-horn" or "cone-shaped tool." It is known that by such a shape of an elongated vibratory body the amplitude of oscillation at the free outer end is greatly increased. A similar effect can be obtained also if there is not a continuous taper between the free vibratable ends of the vibratory body but if the diameter is stepped down as illustrated by way of example in FIG. 10a.

The sonic or ultrasonic vibration at the outer free end of the vibratory body can be utilized with advantage for introducing high frequency oscillations into a liquid. In this case it would be advisable to provide the vibratory body at its outer end with a portion of greatly increased diameter and area so that the sound wave amplitudes introduced into the liquid correspond to the maximum of oscillation energy that can be produced by the cooperation of the magnetic means of the apparatus.

Sometimes it is desirable to dissipate or to atomize liquids by sonic or ultrasonic oscillation. In this case it would be advisable to provide the outer portion of the vibratory body 5c" according to FIG. 9 with an internal bore or channel 25 terminating at the free outer end with at least one discharge opening 27 while communicating with a supply 26 of the liquid to be dispersed, through the holding ring 6'. In this manner any liquid like oil or others introduced into the channel 25 will be dissipated by the oscillation at the free outer end of the body 5c".

Also the dissipation of other liquid materials may be effected very efficiently by the apparatus according to the invention. This is illustrated by FIGS. 10a and 10b. The illustrated example applies to the dissipation of liquid melts, e.g., of molten metal for the purpose of producing a fine metal powder thereof. In this case a container 21 containing the molten or liquified metal L may be provided with an opening 21' through which projects the outer end portion 5e' of a vibratory body 5e. The portion 5e' is provided with fine slots 5e" as clearly shown in FIG. 10b which is a plan view of the end face 5E of the body 5e. Of course, the cylindrical end of the portion 5e should fit closely into the opening 21'. The oscillation of the portion 5e' will not be hampered thereby. It will be understood that the molten metal will reach the outside face 5E through the slots 5e" and will be finely dissipated by the vibration of the body 5e. For instance if the melt L consists of lead, tin, bismuth or the like and if the dissipated droplets of molten metal are caused to drop through an atmosphere of protective gas until they solidify, then at the bottom end of their drop a clean fine powder of the respective metal will be collected.

Finally, the free outer end of the vibratory body may be provided with means for attaching other accessories or extensions or amplitude amplifiers to the vibratory body. This is shown for instance in FIG. 8 where the outer end of the vibratory body 5c is provided with a threaded stud 5c'. It is easy to understand that in this manner any desired tools, implements or the like may be attached to the freely vibrating outer end of the vibratory body.

It will be understood that oscillations of the type described can be produced by the apparatus according to the invention also if the speed of rotation does not correspond to the resonant frequency of the respective vibratory body. However, since always maximum efficiency and energy output will be desired it is certainly most desirable and advisable to operate the apparatus according to the invention in such a manner that the output oscillation is substantially equal to the resonant frequency of the vibratory body. Therefore it will be useful to combine the apparatus with conventional means whereby the current rotation of the rotating magnetic means is automatically regulated so as to remain as constant as possible during operation of the apparatus.

Generally it can be stated that the oscillatory output of the free end of the vibratory body of the apparatus according to the invention may be used successfully and most efficiently in all fields of application of sonic or ultrasonic oscillations as for instance for ultrasonic drilling, welding, emulsifying, dissipating and the like.

It has been mentioned above that if the elongated vibratory body is mass-symmetrical, the location of its node is the same for longitudinal and torsional oscillation so that with one holding means 6 attached to the stationary portion of the vibratory body either one of the above-mentioned two modes of oscillation can be produced simply by arbitrarily selecting the rotary speed of the shaaft 8 so as to correspond to the resonant frequencies associated with one or the other of said modes of oscillations.

However, in case the vibratory body is not mass-symmetrical then the change from one to the other rotary speed corresponding to the respective resonant frequency of a selected mode of oscillation must be accompanied by a change of location of the holding means along the vibratory body because in this case the location of the node differs.

Such an arrangement according to the invention is diagrammatically illustrated in FIG. 10a. As can be seen, the elongated vibratory body 5e is provided with two grooves 6a" located to coincide with the location of the nodes of longitudinal and torsional oscillation, respectively. Mounted in the housing wall 11' of a housing similar to the housing 11 of FIG. 8 are mounted first and second holding means 6' and 6" cooperating with the grooves 6a", respectively. In this example each of the holding means 6' and 6" is constituted by a plurality of annular segments, each held in a backing member 11a', 11a", respectively, which are movable in radial direction relative to the axis of the body 5e by means of individual adjustment screws 11b' and 11b", respectively.

In FIG. 10a the arrangement is shown in a position in which the upper set of holding means 6' is in engagement with the upper groove 6a" while the lower set of holding means 6" is retracted, e.g., by spring means not shown. Consequently, one of the node points of the body 5e is caused to coincide with the location of the stationary portion of the body 5e where the holding means engages the latter. If a change to a different mode of oscillation associated with the second node point is desired, the holding means 6" would be moved into engagement with the lower groove 6a″, while the upper holding means 6′ would be permitted to disengage the body 5e by reverse operation of the adjustment screws 11b′.

For the purpose of proper interpretation of the claims it should be noted that "magnetic alignment" means a relative position between cooperating magnets by which a maximum of magnetic flux between the magnets is achieved, while "magnetic disalignment" means a relative position in which the magnetic flux between the magnets is reduced to a minimum. In other words, "magnetic alignment" means position of maximum attraction while "magnetic disalignent" means a position of maximum repulsion.

It will be understood that each of the elements described above or two or more together, may also find a useful application in other types of apparatus for producing sonic and ultrasonic oscillation of a vibratory body differing from the types described above.

While the invention has been illustrated and described as embodied in an apparatus for producing sonic and ultrasonic oscillations of a vibratory body by the interaction of first and second magnetic means one of which is attached to the vibratory body, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are inended to be comprehended within the meaning and range of equivalence of the following claims.

What is claimed and desired to be secured by Letters Patent is:

1. Apparatus for producing sonic and ultrasonic oscillations of a vibratory body, comprising, in combination, an elongated vibratory body having an axis and within the sonic and ultrasonic frequency range together with any member attached thereto a predetermined resonant frequency for a predetermined mode of oscillation and including a stationary portion substantially coinciding with the node of said elongated body when it oscillates at said predetermined resonant frequency and mode of oscillation and a freely vibratable portion; holding means for stationarily holding said stationary portion of said vibratory body while permitting said freely vibratable portion thereof to oscillate; first magnetic means firmly attached to said freely vibratable portion of said vibratory body and comprising a plurality of magnets each having a north and south pole and arranged so that the north pole of one magnet is disposed next to the south pole of the adjacent magnet, said magnets being in a plane perpendicular to said axis and surrounding the latter, the orientation of the magnetic field produced by each of said magnet means being opposite to that produced by the respectively neighboring magnet means; second magnetic means mounted rotatably about said axis and adjacent to said first magnetic means independently therefrom and from said freely vibratable portion of said vibratory body and comprising an assembly of a plurality of magnets similar to that of said first magnetic means and arranged in a plane perpendicular to said axis and surrounding the latter, the orientation of the magnetic field produced by each of said magnet means of said assembly being opposite to that produced by the respectively neighboring magnet means, said first and second magnetic means cooperating in such a manner that when said second magnetic means is periodically caused to change between magnetic attraction and repulsion with said first magnetic means it causes oscillation of said freely vibratable portion of said vibratory body; and means for rotating said second magnetic means so as to periodically change it between magnetic attraction and repulsion with said first magnetic means at said resonant frequency within the sonic and ultrasonic frequency range so as to thereby cause corresponding oscillation of said freely vibratable portion of said vibratory body at said resonant frequency.

2. Apparatus for producing sonic and ultrasonic oscillations of a vibratory body, comprising, in combination, an elongated vibratory body having an axis and within the sonic and ultrasonic frequency range together with any member attached thereto a predetermined resonant frequency for a predetermined mode of oscillation and including a stationary portion substantially coinciding with the node of said elongated body when it oscillates at said predetermined resonant frequency and mode of oscillation and a freely vibratable portion; holding means for stationarily holding said stationary portion of said vibratory body while permitting said freely vibratable portion thereof to oscillate; first magnetic means firmly attached to said freely vibratable portion of said vibratory body and comprising a plurality of permanent magnets each having a north and south pole and arranged so that the north pole of one magnet is disposed next to the south pole of the adjacent magnet, said magnets being in a plane perpendicular to said axis and surrounding the latter, the orientation of the magnetic flux in each of said magnet means being opposite to that in the respectively neighboring permanent magnets; second magnetic means mounted rotatably about said axis and adjacent to said first magnetic means independently therefrom and from said freely vibratable portion of said vibratory body and comprising an assembly of a plurality of permanent magnets similar to that of said first magnetic means and arranged in a plane perpendicular to said axis and surrounding the latter, the orientation of the magnetic flux in each of said permanent magnets of said assembly being opposite to that in the respectively neighboring permanent magnets, said first and second magnetic means cooperating in such a manner that when said second magnetic means is periodically caused to change between magnetic attraction and repulsion with said first magnetic means it causes oscillation of said freely vibratable portion of said vibratory body; and means for rotating said second magnetic means so as to periodically change it between magnetic attraction and repulsion with said first magnetic means at said resonant frequency within the sonic and ultrasonic frequency range so as to thereby cause corresponding oscillation of said freely vibratable portion of said vibratory body at said resonant frequency.

3. Apparatus for producing sonic and ultrasonic oscillations of a vibratory body, comprising, in combination an elgonated vibratory body having an axis and within the sonic and ultrasonic frequency range together with any member attached thereto a predetermined resonant frequency for a predetermined mode of oscillation and including a stationary portion substantially coinciding with the node of said elongated body when it oscillates at said predetermined resonant frequency and mode of oscillation and a freely vibratable portion; holding means for stationarily holding said stationary portion of said vibratory body while permitting said freely vibratable portion thereof to oscillate; first magnetic means firmly attached to said freely vibratable portion of said vibratory body and comprising a plurality of permanent magnets each having a north and south pole and arranged so that the north pole of one magnet is disposed next to the south pole of the adjacent magnet, said magnets being in a plane perpendicular to said axis and polarized in the direction of said axis, and surrounding the latter, the orientation of the magnetic flux in each of said magnet means being opposite to that in the respectively neighboring permanent magnets; second magnetic means mounted rotatably about said axis and adjacent to said first magnetic means independently therefrom and from said freely vibratable portion of said vibratory body and comprising an assembly of a plurality of permanent magnets similar to that of said first magnetic means and arranged in a plane perpendicular to said axis and polarized in the direction of said axis, and surrounding the latter, the orientation of the magnetic flux in each of said permanent magnets of said assembly being opposite to that in the respectively neighboring permanent magnets, said first and second magnetic means cooperating in such a manner that when said second magnetic means is periodically caused to change between magnetic attraction and repulsion with said first magnetic means it causes oscillation of said freely vibratable portion of said vibratory body; and means for rotating said second magnetic means so as to periodically change it between magnetic attraction and repulsion with said first magnetic means at said resonant frequency within the sonic and ultrasonic frequency range so as to thereby cause corresponding oscillation of said freely vibratable portion of said vibratory body at said resonant frequency.

4. An apparatus as claimed in claim 3, wherein spacer members of nonmagnetic material are interspersed between said permanent magnets of said first magnetic means and also between those of said second magnetic means, respectively.

5. An apparatus for producing sonic and ultrasonic oscillations of a vibratory body, comprising, in combination, an elongated vibratory body having an axis and within the sonic and ultrasonic frequency range together with any member attached thereto a predetermined resonant frequency for a predetermined mode of oscillation and including a stationary portion substantially coinciding with the node of said elongated body when it oscillates at said predetermined resonant frequency and mode of oscillation and a freely vibratable portion; holding means for stationarily holding said stationary portion of said vibratory body while permitting said freely vibratable portion thereof to oscillate; first magnetic means firmly attached to said freely vibratable portion of said vibratory body and comprising a plurality of permanent magnets each having a north and south pole and arranged so that the north pole of one magnet is disposed next to the south pole of the adjacent magnet, said magnets being in a plane perpendicular to said axis and polarized in the direction of said plane and substantially circumferentially about said axis, and surrounding the latter, the orientation of the magnetic flux in each of said magnet means being opposite to that in the respectively neighboring permanent magnets; second magnetic means mounted rotatably about said axis and adjacent to said first magnetic means independently therefrom and from said freely vibratable portion of said vibratory body and comprising an assembly of a plurality of permanent magnets similar to that said first magnetic means and arranged in a plane perpendicular to said axis and polarized in the direction of said plane and substantially circumferentially about said axis, and surrounding the latter, the orientation of the magnetic flux in each of said permanent magnets of said assembly being opposite to that in the respectively neighboring permanent magnets, said first and second magnetic means cooperating in such a manner that when said second magnetic means is periodically caused to change between magnetic attraction and repulsion with said first magnetic means it causes oscillation of said freely vibratable portion of said vibratory body; and means for rotating said second magnetic means so as to periodically change it between magnetic attraction and repulsion with said first magnetic means at said resonant frequency within the sonic and ultrasonic frequency range so as to thereby cause corresponding oscillation of said freely vibratable portion of said vibratory body at said resonant frequency.

6. An apparatus as claimed in claim 5, wherein spacer members of highly saturable ferromagnetic material are interspersed between said permanent magnets of said first magnetic means and also between those of said second magnetic means, respectively.

7. An apparatus as claimed in claim 6, wherein said spacer members are composed of laminations of said ferromagnetic material.

8. An apparatus as claimed in claim 2, wherein at least one of said magnetic means further includes a plate of non-magnetizable material of high tensile strength attached to said permanent magnets, and a bandage of non-magnetizable high tensile strength material surrounding said plurality of permanent magnets.

9. An apparatus as claimed in claim 1, comprising a plurality of sets of said first and second magnetic means in coaxial arrangement, the first magnetic means of said sets being mechanically coupled, and the second magnetic means of said sets being mechanically coupled, so that the oscillation producing effects of each of said sets are superimposed upon each other.

10. An apparatus as claimed in claim 1, including air current producing means connected with said rotatable second magnetic means for the purpose of cooling the apparatus.

11. An apparatus as claimed in claim 1, including adjustment means for varying the axial distance between said first and second magnetic means for the purpose of facilitating the start of rotation of said second magnetic means and of regulating the intensity of the oscillation produced by the cooperation of said first and second magnetic means.

12. An apparatus as claimed in claim 11, wherein said means for rotating said second magnetic means include speed-responsive control means for automatically controlling said adjustment means in such a manner that said axial distance between said first and second magnetic means is automatically decreased as the speed of rotation of said second magnetic means increases after its start.

13. An apparatus as claimed in claim 1, wherein said elongated vibrating body includes a second freely vibratable portion, said stationary portion thereof being located in axial direction between said two freely vibratable portions.

14. An apparatus as claimed in claim 13, wherein the diameter of said vibratory body decreases between said two freely vibratable portions toward the outer end of said second freely vibratable portion so that the oscillation amplitudes increase toward said outer end.

15. An apparatus as claimed in claim 13, wherein the outer end of said second freely vibratable portion is formed with a central recess surrounded with a substantially circular rim so that by application of said rim oscillating at said frequency to a weldable object a substantially circular welding can be produced.

16. An apparatus as claimed in claim 13, wherein the outer end of said second freely vibratable portion includes means for dissipating liquids under the action of the oscillation of said outer end of said vibrating member.

17. An apparatus as claimed in claim 16, wherein said second freely vibratable portion includes at least one inner channel having at least one discharge opening at said outer end and communicating through said stationary portion and through said holding means with a supply of said liquid.

18. An apparatus as claimed in claim 13, wherein the outer end of said second freely vibratable portion includes means for attaching thereto any desired implement adapted to be oscillated by the oscillation of said outer end of said second freely vibratable portion.

19. Apparatus for producing sonic and ultrasonic oscillations of vibratory body, comprising, in combination, an elongated vibratory body having an axis and within the sonic and ultrasonic frequency range together with any member attached thereto a first predetermined resonant frequency for longitudinal oscillation and a second predetermined resonant frequency for torsional oscillation and including a stationary portion substantially coinciding with the first node of said elongated body characteristic thereof when it oscillates at said first predetermined resonant frequency and substantially coinciding with the second node characteristic thereof when said body oscillates at said second predetermined resonant frequency and a freely vibratable portion; holding means for stationarily holding said stationary portion of said vibratory body while permitting said freely vibratable portion thereof to oscillate; first magnetic means firmly attached to said freely vibratable portion of said vibratory body and comprising a plurality of magnet means arranged in a plane perpendicular to said axis and surrounding the latter, the orientation of the magnetic field produced by each of said magnet means being opposite to that produced by the respectively neighboring magnet means; second magnetic means mounted rotatably about said axis and adjacent to said first magnetic means independently therefrom and from said freely vibratable portion of said vibratory body and comprising an assembly of a plurality of magnet means arranged in a plane perpendicular to said axis and surrounding the latter, the orientation of the magnetic field produced by each of said magnet means of said assembly being opposite to that produced by the respectively neighboring magnet means, said first and second magnetic means cooperating in such a manner that when said second magnetic means is periodically caused to change between magnetic alignment and disalignment with said first magnetic means it causes oscillation of said freely vibratable portion of said vibratory body; and means for rotating said second magnetic means so as to periodically change it between magnetic alignment and disalignment with said first magnetic means within the sonic and ultrasonic frequency range alternatively at a selected one of said first and second resonant frequencies so as to thereby cause corresponding oscillation of said freely vibratable portion of said vibratory body at said selected one of said frequencies and with the mode of oscillation corresponding to said selected frequency.

20. In apparatus as claimed in claim 19, wherein said holding means are changeable between a condition of holding said stationary portion when it coincides with said first node, and a condition of holding said stationary portion when it coincides with said second node.

21. Apparatus for producing sonic and ultrasonic oscillations of vibratory body, comprising, in combination, an elongated mass-symmetric vibratory body having an axis and within the sonic and ultrasonic frequency range together with any member attached thereto a first predetermined resonant frequency for longitudinal oscillation and a second predetermined resonant frequency for torsional oscillation and including a stationary portion substantially coinciding with the node of said elongated body characteristic thereof when it oscillates at said first predetermined resonant frequency as well as at said second resonant frequency and in the respectively corresponding mode of oscillation and a freely vibratable portion; holding means for stationarily holding said stationary portion of said vibratory body while permitting said freely vibratable portion thereof to oscillate; first magnetic means firmly attached to said freely vibratable portion of said vibratory body and comprising a plurality of magnet means arranged in a plane perpendicular to said axis and surrounding the latter, the orientation of the magnetic field produced by each of said magnet means being opposite to that produced by the respectively neighboring magnet means; second magnetic means mounted rotatably about said axis and adjacent to said first magnetic means independently therefrom and from said freely vibratable portion of said vibratory body and comprising an assembly of a plurality of magnet means arranged in a plane perpendicular to said axis and surrounding the latter, the orientation of the magnetic field produced by each of said magnet means of said assembly being opposite to that produced by the respectively neighboring magnet means, said first and second magnetic means cooperating in such a manner that when said second magnetic means is periodically caused to change between magnetic alignment and disalignment with said first magnetic means it causes oscillation of said freely vibratable portion of said vibratory body; and means for rotating said second magnetic means so as to periodically change it between magnetic alignment and disalignment with said first magnetic means within the sonic and ultrasonic frequency range alternatively at a selected one of said first and second resonant frequencies so as to thereby cause corresponding oscillation of said freely vibratable portion of said vibratory body at said selected one of said frequencies and with the mode of oscillation corresponding to said selected frequency.

References Cited by the Examiner

UNITED STATES PATENTS

| | | | |
|---|---|---|---|
| 1,543,124 | 6/1925 | Ricker | 73—67.2 X |
| 2,034,787 | 3/1936 | Williams | 310—25 X |
| 2,432,436 | 12/1947 | Morrill. | |
| 2,514,080 | 7/1960 | Mason | 73—67.2 X |
| 3,089,425 | 5/1963 | Sprague | 310—103 X |
| 3,100,853 | 8/1963 | Kleesattel | 310—26 |
| 3,184,842 | 5/1965 | Maropis | 310—8.2 X |

FOREIGN PATENTS

| | | |
|---|---|---|
| 1,150,327 | 8/1957 | France. |
| 1,309,639 | 10/1962 | France. |
| 525,777 | 5/1931 | Germany. |

MILTON O. HIRSHFIELD, *Primary Examiner.*

D. X. SLINEY, *Assistant Examiner.*